United States Patent [19]

Mayet

[11] Patent Number: 4,944,828
[45] Date of Patent: Jul. 31, 1990

[54] DEVICE AND METHOD FOR THE MANUFACTURE OF A TIRE REINFORCEMENT FROM A SINGLE CORD

[75] Inventor: Jean-Claude Mayet, Clermont-Ferrand, France

[73] Assignee: Compagnie Generale des Etablissements Michelin - Michelin et Cie, Clermont-Ferrand Cedex, France

[21] Appl. No.: 308,096

[22] Filed: Feb. 8, 1989

[30] Foreign Application Priority Data

Feb. 19, 1988 [FR] France .................. 88 02102

[51] Int. Cl.⁵ .............. B29D 30/38; B29D 30/20
[52] U.S. Cl. .................... 156/397; 156/117
[58] Field of Search ............ 156/117, 440, 397, 431, 156/134, 426; 152/559

[56] References Cited

U.S. PATENT DOCUMENTS

| 852,855 | 5/1907 | Sloper et al. |
|---|---|---|
| 1,259,997 | 3/1918 | Kline |
| 1,321,402 | 11/1919 | Stowe |
| 1,328,006 | 1/1920 | McLeod |
| 1,349,390 | 8/1920 | Swinehart |
| 2,139,840 | 12/1938 | McKone |
| 2,906,314 | 9/1959 | Trevaskis ............ 156/397 X |
| 4,277,295 | 7/1981 | Schmidt et al. |
| 4,370,183 | 1/1983 | Albo |
| 4,401,493 | 8/1983 | Bailey et al. |
| 4,409,059 | 10/1983 | Holyroyd et al. |
| 4,795,523 | 1/1989 | Laurent et al. |

FOREIGN PATENT DOCUMENTS

| 0009018 | 3/1980 | European Pat. Off. |
|---|---|---|
| 1291112 | 3/1969 | Fed. Rep. of Germany |
| WO83/02749 | 8/1983 | PCT Int'l Appl. |

Primary Examiner—Raymond Hoch
Attorney, Agent, or Firm—Brumbaugh, Graves, Donohue & Raymond

[57] ABSTRACT

A method and device for securing the ends of a single reinforcement cord (4) to the unvulcanized core (7) of a tire utilizing two jaws (10, 11) which clamp the cords arranged at the starting end (41, 42) and terminating end (43, 44) of the reinforcement. A cutting blade (13) cuts the cord which then, without loosening the jaws, are pressed against the core (7) in order to immobilize the cord (4) due to the layer of raw rubber with which the core (7) has been previously covered.

2 Claims, 3 Drawing Sheets

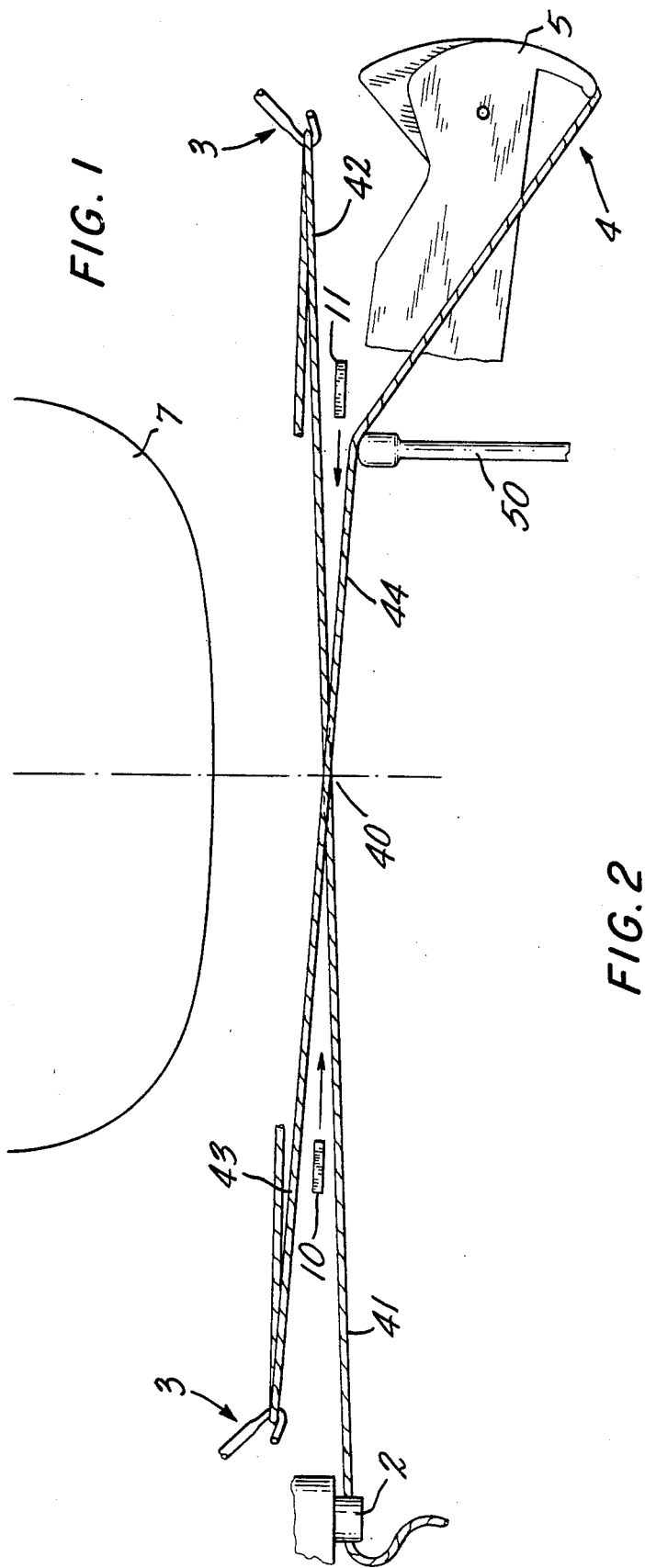

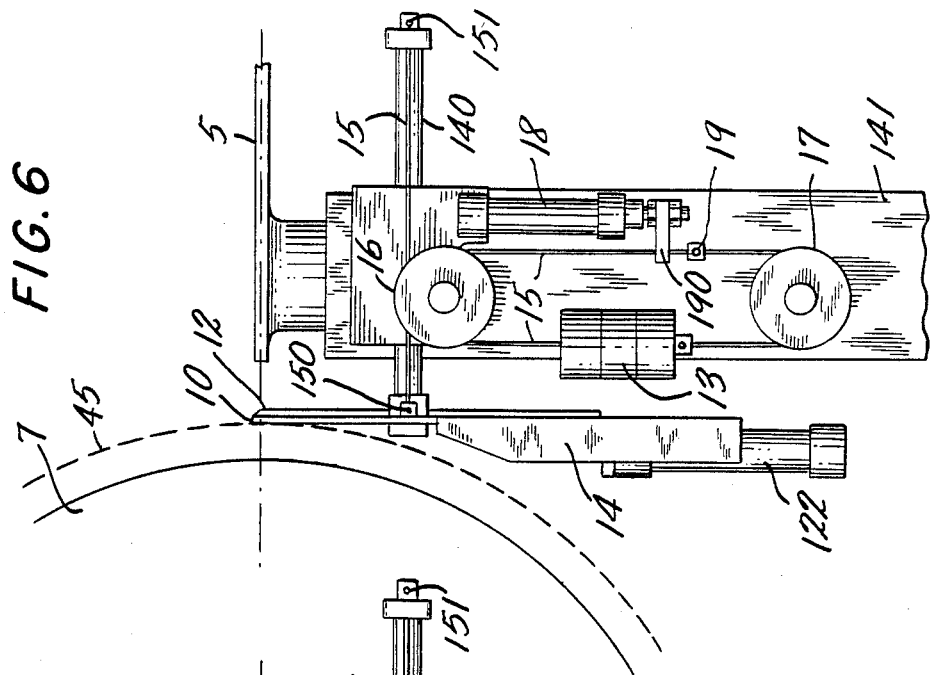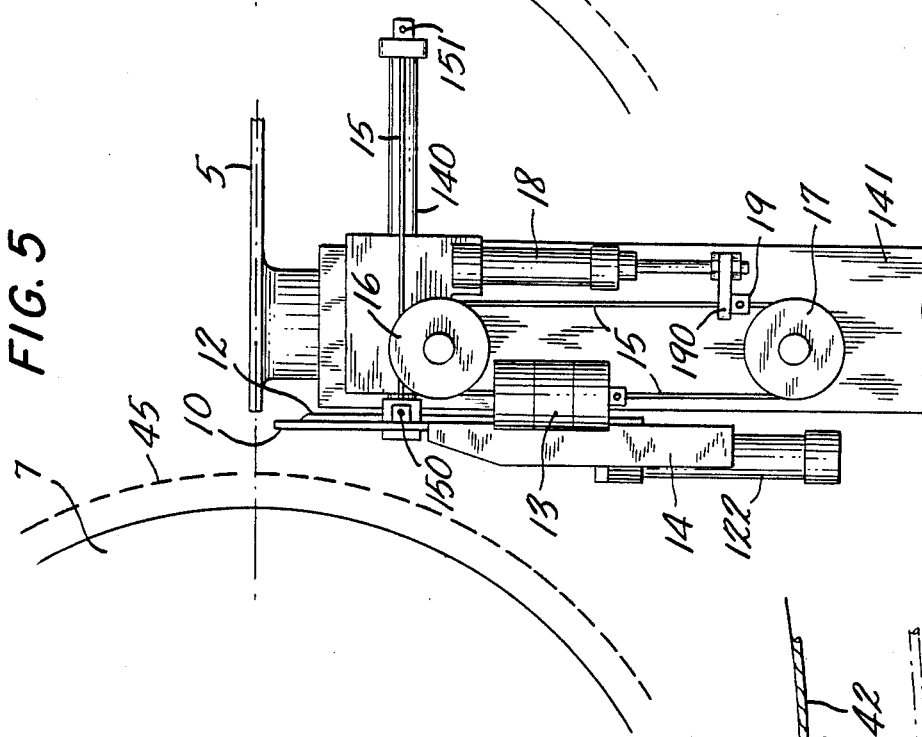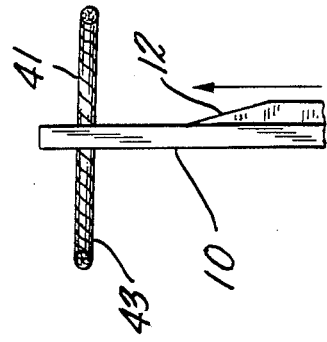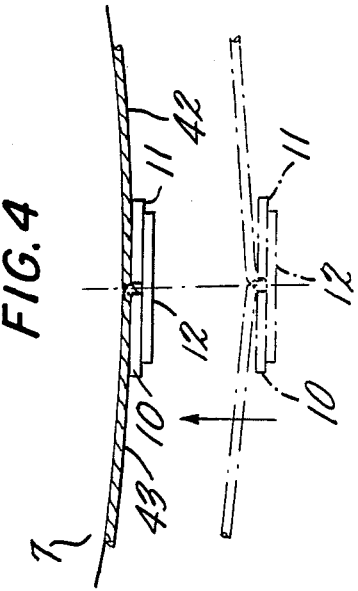

DEVICE AND METHOD FOR THE MANUFACTURE OF A TIRE REINFORCEMENT FROM A SINGLE CORD

The present invention relates to the manufacture of tires. More particularly, it concerns a stage in the manufacture of a reinforcement from a single cord, in accordance with the principle described in U.S. Pat. No. 4,795,523, issued Jan. 3, 1989, which is incorporated herein by reference.

The tire reinforcement described in that patent is produced by hooking a continuous cord to two circles of cord-retention means so as to define a cylinder by a plurality of forward and return cord movements from one retaining means to the other. Thereupon, by a suitable movement of the retaining means the cords are folded over and around the core so that the reinforcement assumes, or starts to assume, its final place in the tire. But before the cylindrical cord is folded over the core, it is necessary to separate the cord from the unwinding means. This is the role of a head, shown in FIGS. 12 and 12a of that patent, said head assuring the gluing of the last length of cord placed to the first length of cord placed.

The present invention is directed at eliminating the use of glue when completing the unwinding of the cord. Use is made of the self-adherence properties of the cord used on the layer of raw rubber with which the core has been previously covered.

The device according to the invention comprises:

(1) two jaws disposed on opposite sides of the strands of cords to be cut which clamp the cord by movement of one toward the other in a direction parallel to the axis of said core;

(2) a system for cutting the cord on the side of the jaws which is opposite the core; and (3) means for bringing said jaws against said core while holding them closed.

For an understanding of the invention and its advantages, reference can be made to the description which follows and to the accompanying drawings in which:

FIG. 1 shows the device and the core in the final phase of the hooking of the cord with the jaws spaced apart;

FIG. 2 is an enlarged view of the device showing the jaws in clamped position;

FIG. 3 is an elevational view of the device showing the cutting of the cords;

FIG. 4 shows the application of the reinforcement cord onto the core;

FIGS. 5 and 6 show the drive for movement of the device; and

Figure 7:
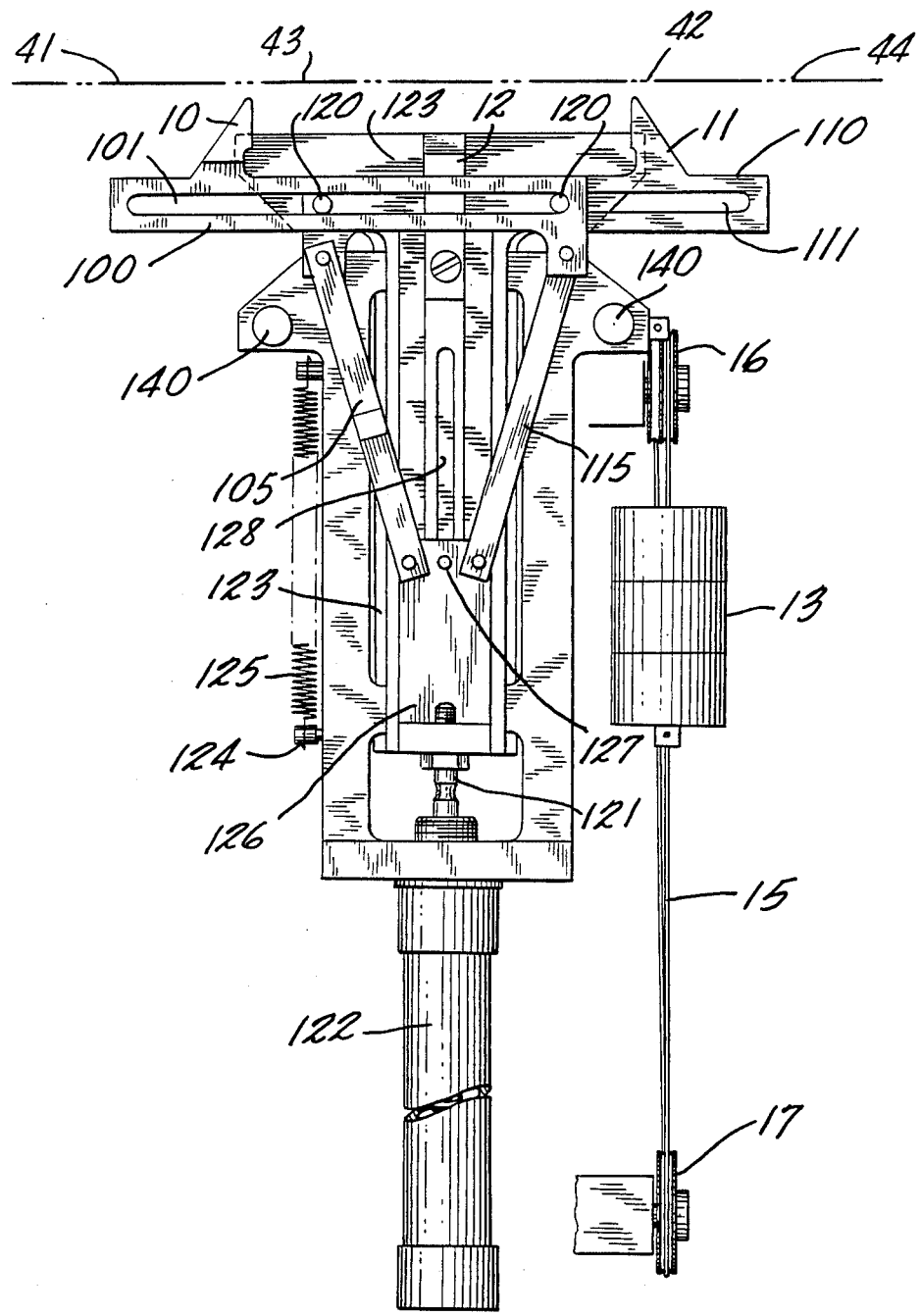
FIG. 7 shows the drive for movement of the jaws.

The term "cord" as used herein refers generally to all filiform elements which can be used to construct what is generally referred to as carcass-ply or tread-ply. FIG. 1 shows the core 7 which defines the shape of the inner surface of the tire to be manufactured. This core is covered with a layer of unvulcanized rubber.

At its starting end the cord 4 has been introduced into the clamp 2 and then been hooked to the first retention means 3 encountered by the rotary arm 5, only the end of which has been shown here in order not needlessly to complicate the drawing. The segments 41 and 42 constitute the first length of cord 4 placed, in accordance with the definition of the term "length" given in the aforementioned patent in which further details will be found with regard to the process and apparatus for which the device of the present invention is used. At the end of this phase of manufacture, that is to say, after the cord has been hooked in the form of a cylinder 45 about the core, the rotary arm 5 is stopped on the side opposite the clamp 2 and the cord 4 presents itself in two linear lengths 41+42 and 43+44 which are tensioned and slightly inclined, one with respect to the other, intersecting at a point 40. It is preferable that this point 40 be located transversely substantially in the middle of the future tire. For this, a suitable advance can be imparted to the arm 5 or else a bar 50 can be actuated in order to displace the cord 4.

The device of the present invention includes a pair of jaws 10 and 11. These jaws 10 and 11 are inserted from opposite sides of this crossing point 40, on the one hand, between the segment 41 of the cord 4 attached to the clamp 2 and the segment 43 hooked on to the last retaining means 3 encountered by the arm 5 and, on the other hand, between the segment 44 connecting the outlet orifice of the arm 5 and the segment 42 hooked to the first retention means 3 encountered by the arm at the start of this phase of manufacture. The device is designed and implanted on the manufacturing apparatus in such a manner that the closing movement of the jaws is parallel to the axis of the core 7, that is to say approximately parallel to the bisector of the angle formed by the segments 41 and 43 of cord 4. The closing movement is indicated diagrammatically in FIG. 1 by arrows in the vicinity of each of the jaws.

In this way, after the closing of the jaws 10 and 11 (FIGS. 2 and 3), one finds, on one side of them (core 7 side), the segments 42 and 43 of the cord 4 hooked to the retention means 3, that is to say those segments which are to be part of the reinforcement of the tire. On the other side of the jaws there are the segments 41 and 44 connected to the clamp 2 and the arm 5, respectively, that is to say, those segments which are not to be incorporated in the reinforcement.

On the side opposite the core 7 there is provided a cutting system formed here, very simply, by a cutting blade 12 which moves along the jaws 10 and 11.

FIG. 7 shows in detail an embodiment of the drive movement of the jaws 10 and 11 and of the blade 12. A first slideway 123 which is controlled by a cylinder and piston unit 122 and a slot device, spur 124 and return spring 125, permits the introduction of the jaws 10 and 11 between the segments 41, 43 and 42, 44 of cord 4 (See FIG. 1). The bases 100, 110 of the jaws 10 and 11 have slots 101 and 111 which make it possible to maintain them on the spurs 120 which, in turn, are fastened on the slideway 123, while permitting relative movement of the jaws 10 and 11 towards and away from each other. This relative movement is driven by a toggle system formed of two connecting rods 105 and 115, each articulated on one of the bases 100, 110, on the one hand, and on a slide 126 firmly attached to the head 121 of the cylinder and piston unit 122. The extending of the cylinder and piston unit 122 causes the opening of the V formed by the connecting rods 105 and 115, thus bringing together the jaws 10 and 11.

Furthermore, an additional extending of the cylinder and piston 122 actuates the blade 12 by the fact that a spur 127 fastened to the slide 126 comes against the end of the slot 128 provided in the blade 12. The arrangement of the connecting rods 105 and 115 is adjusted so that the driving of the blade 12 causes practically no movement of the jaws 10 and 11.

After having cut the cords, the jaws 10 and 11 are brought toward the core 7 without unclamping them, so as to hold the segments 42 and 43 of the cord 4 until the latter are applied to the unvulcanized rubber which is capable of retaining them by adhesion. For this purpose, the jaws accompany the movement imparted to the entire reinforcement by the retention means 3. The jaws are relaxed when a sufficient length of the segments 42 and 43 of cord, 4 (start and end of the reinforcement) is embedded well into the unvulcanized rubber covering the core 7.

The means used to assure this approach comprise a counterweight 13, shown in FIGS. 5 and 6, which makes it possible, as soon as the jaws 10 and 11 are in contact with the cylinder 45 of lengths of cords 4, to accompany the decrease in diameter thereof at the start of the phase of the folding on and around the core 7. The jaws 10 and 11 are borne by a structure 14 which is displaced by a slidable means 140 guided for movement toward and away from the core 7. The approach and return movements of the structure 14 with respect to the core 7 are controlled by a cable 15 which is wound around a pair of pulleys 16 and 17, the shafts of which are rigidly attached to the frame 141 of the machine. The ends of the cable 15 are hooked to the ends of the slidable means 140 at 150 and 151. The movement of the structure 14 toward the core 7 by the counterweight is controlled by the upward movement of the piston of a cylinder and piston unit 18, and the movement of the structure 14 away from the core 7 is controlled by the downward movement of the piston. Toward this end, the cable 15 carries a stop 19 which is maintained in engagement with the driver 190 of the piston by the counterweight, the driver 190 sliding freely on the cable 15. In order to cause the approach movement, the piston of the cylinder and piston unit 18 is moved upwardly. The force necessary for the displacement of the jaws 10 and 11 toward the core 7, is provided by the gravitational effect on the counterweight 13, the weight being calculated so as to cause practically no deformation of the cylinder 45 formed of lengths of cord 4, while assuring, at the end of the approach, sufficient resting of the jaws 10 and 11 against the core to cause the cut, clamped ends of the reinforcement cord to adhere to the unvulcanized rubber.

FIG. 5 shows the structure 14 in position remote from the core 7. This is the position in which the jaws 10 and 11 can clamp the cord 4. FIG. 6 shows the same structure 14 in the approached position of the cylinder 45 of lengths of cord 4. The advantage of the counterweight system 13 is that it makes it possible for the jaws properly to follow the further movement of the reinforcement cords as they are applied onto the core 7 (which is fully explained in the specification of U.S. Patent No. 4,795,523) while assuring a light and constant force of contact in the radial direction.

After the opening of the jaws 10 and 11, the retraction of the structure 14 is effected by the descent of the piston of the cylinder and piston unit 18.

I claim:

1. A device for securing the ends of a tire reinforcement produced by hooking a continuous cord (4) back and forth between two circular arrays of retaining means (3) for the cord (4) so as to define a cylinder by a plurality of forward and return movements from one cord retaining means to the other cord retaining means, then folding the cords (4) on and around a core (7), characterized by the fact that said device comprises:

two jaws (10, 11) disposed on opposite sides of the strands (41+42, 43+44) of cord (4) to be cut which clamp the cord (4) by a movement parallel to a rotational axis of said core (7); a cutting system (12) for the cord (4) on the side of the jaws opposite the core (7); and means for bringing said jaws against said core while holding them closed.

2. A device according to claim 1, characterized by the fact that the means for the approach movement of the said jaws comprise a counterweight (13) which, by gravity supplies the force necessary for the advance of the jaws (10 and 11) toward the core (7).

* * * * *